United States Patent
Xie

(10) Patent No.: US 10,476,587 B2
(45) Date of Patent: Nov. 12, 2019

(54) SYSTEM AND METHOD FOR ENHANCING RELIABILITY IN A TRANSPORT NETWORK

(71) Applicant: Alibaba Group Holding Limited, George Town, Grand Cayman (KY)

(72) Inventor: Chongjin Xie, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 15/169,244

(22) Filed: May 31, 2016

(65) Prior Publication Data
US 2017/0346549 A1    Nov. 30, 2017

(51) Int. Cl.
| | | |
|---|---|---|
| *H04B 10/00* | (2013.01) | |
| *H01S 3/00* | (2006.01) | |
| *G02F 2/00* | (2006.01) | |
| *H04B 10/08* | (2006.01) | |
| *H04B 17/00* | (2015.01) | |
| *H04B 10/038* | (2013.01) | |
| *H04Q 11/00* | (2006.01) | |

(52) U.S. Cl.
CPC ....... *H04B 10/038* (2013.01); *H04Q 11/0066* (2013.01); *H04Q 2011/0058* (2013.01); *H04Q 2011/0081* (2013.01)

(58) Field of Classification Search
USPC ............ 398/9, 10, 11, 19, 20, 28, 30, 37, 38
See application file for complete search history.

(56) References Cited

U.S. PATENT DOCUMENTS

| | | | |
|---|---|---|---|
| 5,305,412 A | 4/1994 | Paoli | |
| 6,016,219 A * | 1/2000 | Fatehi | H04B 10/032 359/341.43 |
| 6,175,560 B1 | 1/2001 | Bhagalia et al. | |
| 6,266,168 B1 * | 7/2001 | Denkin | H04B 10/032 398/20 |
| 6,341,032 B1 * | 1/2002 | Fukashiro | H01S 3/0014 359/337 |
| 6,433,922 B1 | 8/2002 | Ghera | |
| 6,650,468 B1 * | 11/2003 | Bryant | H04B 10/2939 359/349 |
| 6,754,420 B2 * | 6/2004 | Tsuritani | H04B 10/2525 385/123 |
| 6,952,395 B1 * | 10/2005 | Manoharan | H04J 14/0227 370/219 |

(Continued)

*Primary Examiner* — David C Payne
*Assistant Examiner* — Pranesh K Barua
(74) *Attorney, Agent, or Firm* — Shun Yao; Park, Vaughan, Fleming & Dowler LLP

(57) ABSTRACT

One embodiment of the present invention provides an optical link coupling two nodes in an optical transport network. The optical link includes a fiber span, which includes a first optical fiber, a second optical fiber, and a splitter. The input of the splitter is coupled to an input of the fiber span, and first and second outputs of the splitter are coupled, respectively, to the first and second optical fibers. The optical link further includes a first amplifier coupled to the first optical fiber, a second amplifier coupled to the second optical fiber, and an optical switch. Two inputs of the optical switch are coupled to outputs of the first and second amplifiers, respectively; and an output of the optical switch is coupled to an input of a third amplifier.

15 Claims, 12 Drawing Sheets

(56) References Cited

U.S. PATENT DOCUMENTS

| | | | |
|---|---|---|---|
| 7,024,110 B2* | 4/2006 | Jasti | H04B 10/032 398/19 |
| 7,123,404 B1 | 10/2006 | Mori | |
| 7,136,583 B2* | 11/2006 | Oberg | H04B 1/74 398/5 |
| 7,231,146 B2* | 6/2007 | Arecco | H04J 14/0291 398/30 |
| 7,400,829 B2* | 7/2008 | Watanabe | H04B 10/032 385/11 |
| 7,756,422 B2 | 7/2010 | Sakamoto | |
| 8,822,895 B2* | 9/2014 | Abedin | G01M 11/3145 250/205 |
| 9,712,239 B2 | 7/2017 | Murshid | |
| 9,787,418 B2 | 10/2017 | Earl | |
| 9,917,672 B2 | 3/2018 | Jensen | |
| 2001/0021045 A1* | 9/2001 | Tervonen | H04B 10/077 398/5 |
| 2002/0154353 A1 | 10/2002 | Heath | |
| 2004/0037555 A1* | 2/2004 | Evangelides, Jr. | H04B 10/071 398/37 |
| 2004/0090662 A1* | 5/2004 | Bang | G02F 2/004 359/326 |
| 2004/0114925 A1* | 6/2004 | Berthold | H04B 10/2503 398/45 |
| 2004/0146305 A1* | 7/2004 | Neubelt | H04B 10/071 398/173 |
| 2004/0175187 A1* | 9/2004 | Eiselt | H04B 10/2971 398/173 |
| 2004/0208506 A1* | 10/2004 | Kinoshita | H04J 14/0204 398/19 |
| 2004/0213577 A1* | 10/2004 | Sugahara | H04B 10/25253 398/147 |
| 2005/0025486 A1 | 2/2005 | Zhong | |
| 2005/0047781 A1* | 3/2005 | El-Reedy | H04B 10/2942 398/37 |
| 2005/0074236 A1* | 4/2005 | Urimindi | H04B 10/0793 398/12 |
| 2005/0110980 A1 | 5/2005 | Maehara | |
| 2006/0087975 A1* | 4/2006 | Zheng | H04L 43/0829 370/241 |
| 2006/0115266 A1* | 6/2006 | Levi | H04J 14/0291 398/19 |
| 2006/0176545 A1* | 8/2006 | Nakamura | H04B 10/2916 359/334 |
| 2009/0028562 A1* | 1/2009 | Gianordoli | H04B 10/29 398/61 |
| 2009/0103915 A1* | 4/2009 | Aprile | H04J 14/029 398/2 |
| 2009/0226174 A1* | 9/2009 | Csupor | H04B 10/0775 398/89 |
| 2009/0245786 A1 | 10/2009 | Sakamoto | |
| 2009/0262790 A1* | 10/2009 | Molotchko | H04L 1/22 375/220 |
| 2010/0091355 A1 | 4/2010 | Ota | |
| 2010/0284687 A1* | 11/2010 | Tanzi | H04J 14/029 398/1 |
| 2010/0290780 A1* | 11/2010 | Teipen | H04B 10/27 398/27 |
| 2010/0296808 A1* | 11/2010 | Hinderthur | H04B 10/032 398/5 |
| 2011/0116786 A1* | 5/2011 | Wellbrock | H04B 10/032 398/2 |
| 2011/0126005 A1 | 5/2011 | Carpenter | |
| 2011/0274435 A1 | 11/2011 | Fini | |
| 2012/0020672 A1 | 1/2012 | Aguren | |
| 2012/0033966 A1* | 2/2012 | Rosenbluth | G06E 3/003 398/38 |
| 2012/0106971 A1* | 5/2012 | Sugaya | H04J 14/0279 398/97 |
| 2012/0294604 A1* | 11/2012 | Roberts | H04J 14/0291 398/5 |
| 2013/0189856 A1 | 7/2013 | Ko | |
| 2013/0223484 A1 | 8/2013 | Tang | |
| 2013/0236175 A1 | 9/2013 | Sethumadhavan | |
| 2013/0243438 A1 | 9/2013 | Tang | |
| 2013/0272694 A1 | 10/2013 | Sandstrom | |
| 2013/0343757 A1* | 12/2013 | Wigley | H04B 10/032 398/45 |
| 2014/0013402 A1 | 1/2014 | Bugenhagen | |
| 2014/0029941 A1 | 1/2014 | Bratkovski | |
| 2014/0105592 A1* | 4/2014 | Kataria | H04B 10/032 398/2 |
| 2014/0153922 A1 | 6/2014 | Ryf | |
| 2014/0186021 A1* | 7/2014 | Striegler | H04B 10/03 398/2 |
| 2014/0248059 A1 | 9/2014 | Tang | |
| 2014/0258772 A1* | 9/2014 | Kataria | H04B 3/50 714/4.11 |
| 2014/0286648 A1 | 9/2014 | Buelow | |
| 2014/0363171 A1 | 12/2014 | Tang | |
| 2015/0249501 A1 | 9/2015 | Nagarajan | |
| 2015/0296279 A1* | 10/2015 | Bouda | H04L 41/142 398/45 |
| 2015/0341123 A1 | 11/2015 | Nagarajan | |
| 2016/0056889 A1 | 2/2016 | Le Taillandier De Gabory | |
| 2016/0233959 A1 | 8/2016 | Murshid | |
| 2016/0277101 A1 | 9/2016 | Jiang | |
| 2017/0155466 A1 | 6/2017 | Zhou | |
| 2017/0214463 A1 | 7/2017 | Milione | |
| 2017/0299900 A1 | 10/2017 | Montoya | |
| 2017/0353242 A1 | 12/2017 | Mansouri Rad | |
| 2017/0353265 A1 | 12/2017 | Mansouri | |

* cited by examiner

SYSTEM AND METHOD FOR ENHANCING RELIABILITY IN A TRANSPORT NETWORK

BACKGROUND

Field

The present application relates to an optical transport network. More specifically, the present application relates to a system and method that can enhance the reliability of the optical transport network.

Related Art

In the current digital age, IT operations have become a crucial aspect of most operations around the world. To ensure business continuity, organizations need reliable infrastructure for IT operations. For businesses whose most critical operations rely on online activities, such as e-commerce, social networks, Internet search engines, etc., networks with the highest standards of reliability are needed.

To ensure data security, large internet companies often rely on data centers to store their data, and their daily business operations often involve exchanging information among multiple data centers that are interconnected via optical transport networks. Meanwhile, many smaller enterprises may rely on cloud services provided by a third party to meet their IT needs. Cloud service providers also use many interconnected data centers to provide computing services. Any failure in the optical transport network connecting the data centers can cause interruptions in business operations. Therefore, the reliability of the optical transport network is critically important for ensuring normal business operations.

SUMMARY

One embodiment of the present invention provides an optical link coupling two nodes in an optical transport network. The optical link includes a fiber span, which includes a first optical fiber, a second optical fiber, and a splitter. The input of the splitter is coupled to an input of the fiber span, and first and second outputs of the splitter are coupled, respectively, to the first and second optical fibers. The optical link further includes a first amplifier coupled to the first optical fiber, a second amplifier coupled to the second optical fiber, and an optical switch. Two inputs of the optical switch are coupled to outputs of the first and second amplifiers, respectively; and an output of the optical switch is coupled to an input of a third amplifier.

In a variation on this embodiment, the splitter is a 3-dB optical coupler, and the optical switch is a 2×1 switch.

In a variation on this embodiment, the optical link further includes additional fiber spans. Each and every fiber span of the additional fiber spans includes at least two optical fibers, and the at least two optical fibers are carrying substantially similar signals to provide protection against fiber failures in the optical link.

In a variation on this embodiment, the first and second amplifiers are low-noise preamplifiers.

In a further variation, the first and second amplifiers include erbium-doped fiber amplifiers (EDFAs).

In a variation on this embodiment, the third amplifier is a power amplifier.

In a variation on this embodiment, the first or second amplifier is a first stage of a two-stage erbium-doped fiber amplifier (EDFA), and the third amplifier is a second stage of the two-stage EDFA.

In a variation on this embodiment, the optical link further includes first and second photo detectors coupled to the first and second optical fibers, respectively. The optical switch is controlled based on outputs of the first and second photo detectors.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a system and method for ensuring reliability of an optical transport network. More specifically, to prevent interruptions caused by fiber cuts or failures, various protection mechanisms, including path protection and link protection, can be implemented. More specifically, an individual fiber span of the transport network can be protected using a backup span, and a backup route (either an optical route, an electrical route, or an optical-electrical mixed route) can also be provided between two nodes in the network. To mitigate possible degradation in optical signal-to-noise ratio (OSNR) caused by the inclusion of a backup fiber span, a novel optical line section protection (OLSP) module that has very low impact on the OSNR of the network can be implemented. More specifically, the OLSP module can include an optical coupler, a backup fiber, and an optical switch inserted between the two stages of a two-stage erbium-doped fiber amplifier (EDFA).

Optical Line Section Protection (OLSP)

Figure 1:
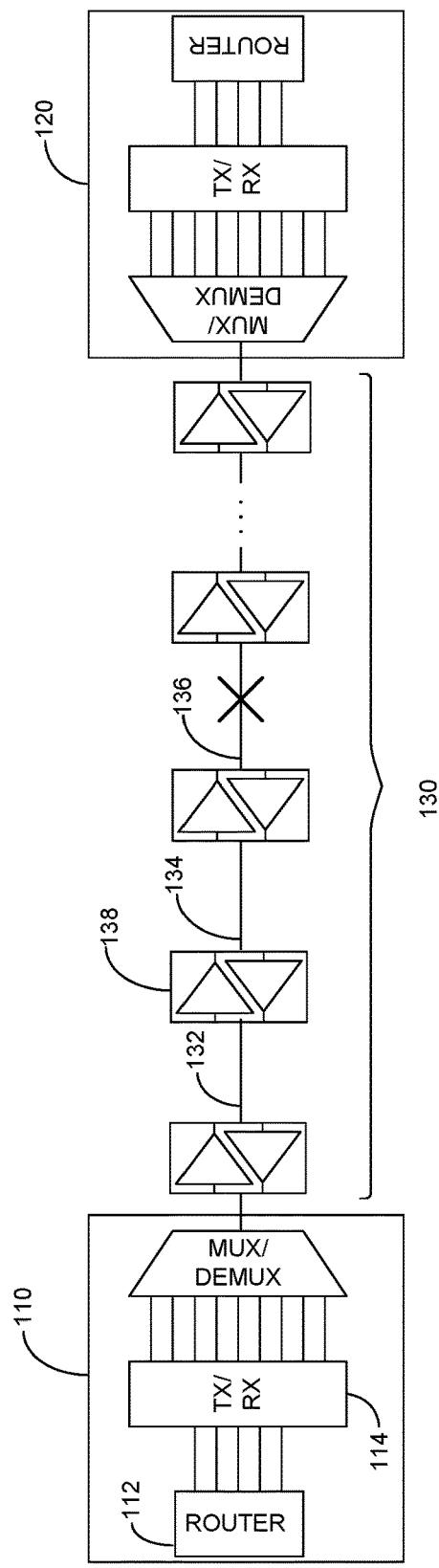
FIG. 1 presents a diagram illustrating an exemplary optical link between two data centers.

FIG. 1 presents a diagram illustrating an exemplary optical link between two data centers. Data centers 110 and 120 are connected to each other via bidirectional optical link 130, which includes multiple fiber spans, such as fiber spans 132, 134, and 136. Note that, in this disclosure, the term "fiber span" refers to an optical fiber (or cable) terminated at both ends, and can include devices that can add, subtract, or attenuate optical signals. A fiber span might not include any amplification devices. In the example shown in FIG. 1, a fiber span, represented by a single line, can include a pair of optical fibers to allow for bidirectional communication. Optical amplifiers, such as an EDFA, can be inserted between consecutive fiber spans to amplify the optical signals. For example, EDFA pair (or bi-directional EDFA) 138 is inserted between fiber spans 132 and 134.

FIG. 1 also shows the transmission/receiving system of each data center. For example, the transmission system of data center 110 includes a router 112, optical transceiver(s) 114, and optical multiplexer/demultiplexer (MUX/DEMUX) 116. For transmission technologies that rely on multiplexing in the wavelength domain to expand data capacity, MUX/DEMUX 116 can combine optical signals of different wavelengths onto a single fiber link (e.g., link 130) and separate optical signals of different wavelengths to different receivers.

As one can see from FIG. 1, whenever there is a fiber cut or failure (either caused by construction or by malicious activities), the communication between the data centers will be interrupted. For example, if there is a cut in fiber span 136, optical signals carried on optical link 130 will be lost, and communication between data centers 110 and 120 will be interrupted. For businesses that rely on such an information flow to operate, this can lead to disastrous consequences.

Moreover, for a point-to-point connection over a single link, a fiber cut at any span can cause the entire link to fail. The maximum distance of a fiber span typically can be between 20 and 80 km. Hence, many fiber spans are needed to establish a long haul link, increasing the possibility of the occurrence of a fiber cut. For example, a fiber link connecting a data center in Beijing to a data center in Shanghai can have up to 30 spans. If the probability of a fiber cut occurring on a fiber span is 0.25%, the probability of a failure occurring on the link between Beijing and Shanghai can then be up to $1-(1-0.25\%)^{30}=7.23\%$. This means that the possibility of link failure caused by fiber failure alone can be up to 7.23%, leading the availability rate of both data centers to be around 92.77%. Such a low availability rate cannot meet the service level agreement (SLA) requirement for many applications, such as financial or medical applications. In fact, many financial institutions require their IT service providers to ensure very high availability, such as five nines (i.e., 99.999%) or higher.

Figure 2:
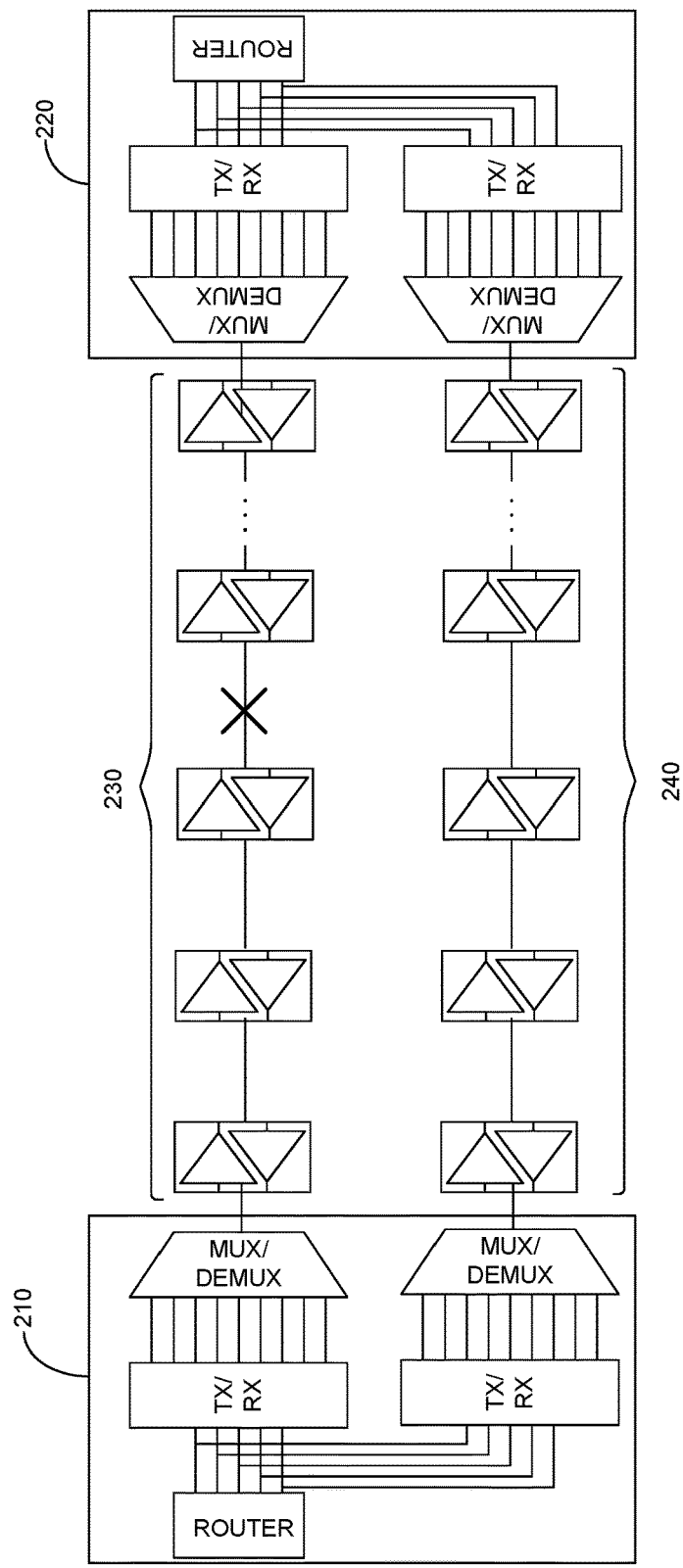
FIG. 2 presents a diagram illustrating a conventional scheme for reducing the fiber-cut-induced failure rate (prior art).

One approach to reducing the failure rate caused by the fiber cut is to provide one or more backup routes. When a fiber failure is detected on the primary route, data traffic can be switched to a backup route without interruptions. FIG. 2 presents a diagram illustrating a conventional scheme for reducing the fiber-cut-induced failure rate (prior art). In FIG. 2, data centers 210 and 220 are connected to each other via a link 230. Additionally, a backup link 240 is also provided between data centers 210 and 220. When a fiber cut occurs on link 230, as shown in FIG. 2, data traffic can be switched to link 240 to ensure normal communications between data centers 210 and 220.

Using the aforementioned link between Beijing and Shanghai as an example, if two routes are used (with one of them being the backup route), the failure rate can be reduced to $7.23\% \times 7.23\% = 0.52\%$, increasing the availability rate to 99.48%. Similarly, four routes can lead to an availability rate exceeding four nines, and six routes can increase the availability rate to six nines. However, establishing backup routes can be very expensive. Establishing two routes for a particular link may require twice the amount of equipment, including optical routers/switches, optical fibers, optical transmission equipment, etc., and four routes may require four times the amount of equipment. In the example shown in FIG. 2, to establish backup link 240, additional transceivers, multiplexers, and amplifiers will be needed. Although major telecommunication service providers, such as AT&T or Verizon, may be able to implement this solution because they already own large fiber networks, smaller carriers or internet companies attempting to establish their own optical transport networks may find such a solution not feasible.

To solve this problem, in some embodiments, a cost-effective approach can be implemented to enhance the reliability of an optical transport network. More specifically, an OLSP mechanism can be implemented on fiber spans to mitigate the negative effect of a fiber cut or failure. OLSP protects a fiber span by implementing a backup fiber for the fiber span. The backup fiber typically is placed at a location that is different from the primary fiber. For example, the primary fiber can be buried in ground while the backup fiber can be carried in the air by utility poles. Other examples can include placing the fibers on different sides of a freeway. The spatial diversity ensures that the likelihood of both fibers being cut is low. When a fiber cut or failure occurs on the primary fiber (which normally carries traffic), data traffic can be switched to the backup fiber without causing service interruptions. Because a fiber span typically does not include any active components, providing backup fibers for fiber spans is much cheaper than establishing a backup route. In further embodiments, each and every fiber span of a link is provided with a backup fiber. This can significantly reduce the rate of failure caused by fiber cuts.

Figure 3:
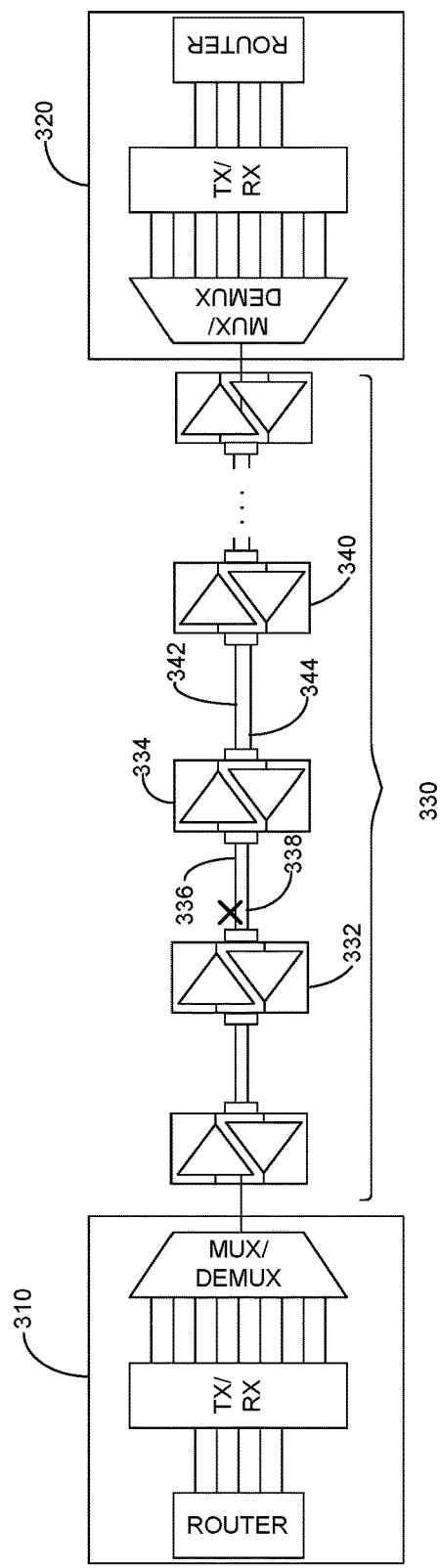
FIG. 3 presents a diagram illustrating the optical line section protection scheme for reducing the fiber-cut-induced failure rate, in accordance with an embodiment of the present invention.

FIG. 3 presents a diagram illustrating the optical line section protection scheme for reducing the fiber-cut-induced failure rate, in accordance with an embodiment of the present invention. In FIG. 3, data centers 310 and 320 are connected to each other via optical link 330, which implements OLSP on each and every fiber span. For example, the fiber span between amplifiers 332 and 334 can include a primary fiber pair 336 and a backup fiber pair 338, and the fiber span between amplifiers 334 and 340 includes a primary fiber pair 342 and a backup fiber pair 344. Under normal conditions, data traffic is typically carried by the primary fibers. However, when a fiber cut occurs on primary fiber pair 336, as shown in FIG. 3, data traffic through the fiber span between amplifiers 332 and 334 will be switched to backup fiber pair 338, without causing interruption to traffic on link 330.

Because each and every span of link 330 is protected by the backup fiber, the failure rate of link 330 can be significantly reduced. Using the aforementioned link between Beijing and Shanghai as an example, where the probability of a fiber cut on a fiber span having a single fiber is 0.25%, if each and every fiber span includes a backup fiber, the fiber-cut-induced failure rate can be reduced to $1-(1-0.25\%\times0.25\%)^{30}=0.01875\%$, increasing the availability rate up to 99.98%. Compared with the non-protected link shown in FIG. 1, the reliability of the OLSP-protected link can be increased by as much as four hundredfold.

Compared to the protection scheme shown in FIG. 2, where a backup route is provided between routers of the data centers, the OLSP scheme shown in FIG. 3 not only costs less money to build and requires less power to operate (no additional active component is needed, and the fiber itself is passive), but also can provide higher reliability. In the example shown in FIG. 2, data traffic will be interrupted if both routes experience a fiber cut or failure, regardless of which span suffers the fiber cut or failure. On the other hand, in the example shown in FIG. 3, unless fiber cuts occur on both fibers of the same span, traffic will not be interrupted. The latter scenario is much less likely to happen.

OLSP with Low OSNR Impact

Typical approaches to allowing traffic to switch to a backup path in times of failure can involve a splitter installed at the starting point of the protected path and a switch installed at the ending point, neither the splitter nor the switch being shown in FIG. 3. The splitter can split the incoming signal into two identical signals, each carried by one path (the primary path and the backup path). At the ending point, the switch can select, from the two identical signals, a signal to be sent to the next segment of the network.

Figure 4A:
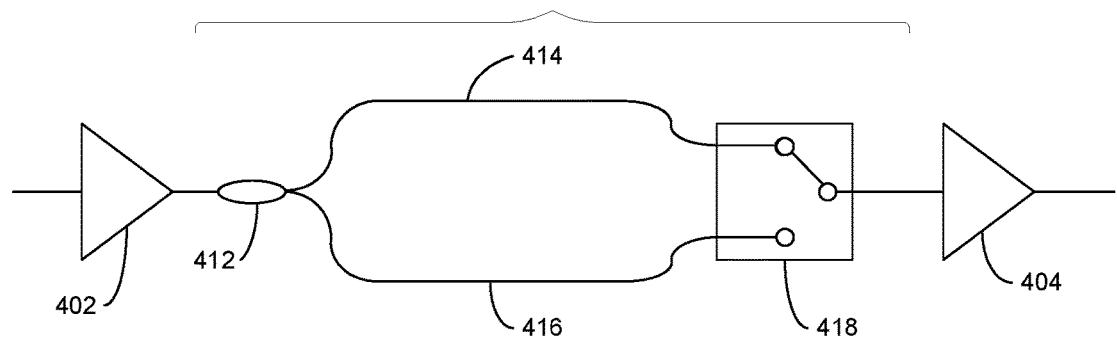
FIGS. 4A and 4B present diagrams illustrating the details of a fiber span implementing optical line section protection (OLSP) in one direction, in accordance with an embodiment of the present invention.
Figure 4B:
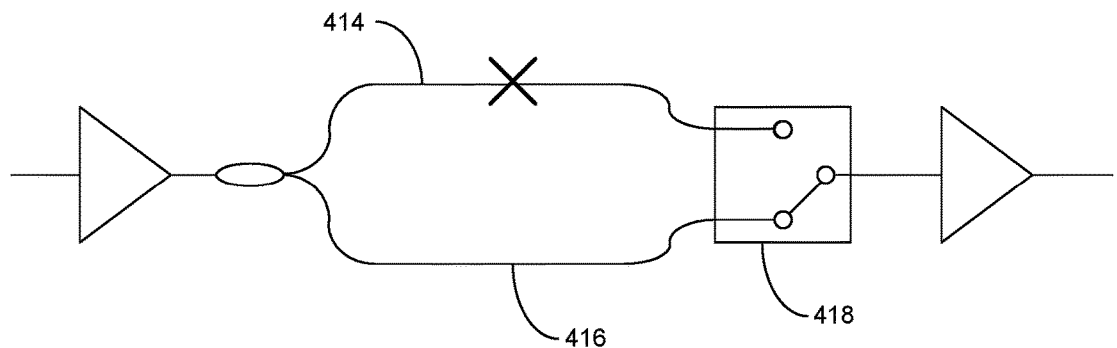

FIGS. 4A and 4B present diagrams illustrating the details of a fiber span implementing OLSP in one direction (the other direction is similar), in accordance with an embodiment of the present invention. In FIG. 4A, fiber span 410 is located between amplifiers 402 and 404. Fiber span 410 implements OLSP and includes an optical splitter 412, fibers 414 and 416, and a switch 418.

Optical splitter 412 can be a passive splitter and can split optical signals outputted by amplifier 402 into multiple signals. In some embodiments, optical splitter 412 can be a 1×2 splitter that splits an incoming optical signal into two output signals. In further embodiments, optical splitter 412 can be a 3-dB coupler that can split the incoming signal into two identical portions and then separately send these two identical portions to fibers 414 and 416.

Switch 418 is responsible for selecting from signals carried on fibers 414 and 416 one signal to be sent to amplifier 404. Under normal conditions, fiber 414 is the primary fiber, and switch 418 can be configured to connect fiber 414 to the input of amplifier 404. When a fiber cut or failure on primary fiber 414 is detected, switch 418 can then be configured to connect fiber 416, which carries the identical signal, to the input of amplifier 414. In some embodiments, switch 418 can also include optical power detectors (not shown in the drawings) that can measure optical power and, hence, can detect the presence or absence of the optical signal. The absence of the optical signal on one fiber typically can indicate a fiber cut or failure. The output of the power detectors can be used to control switch 418. Various types of control logic (not shown in the drawings) can be used to control switch 418.

In the example shown in FIGS. 4A and 4B, coupler 412 is a passive device. Switch 418 and its controlling components (e.g., power detectors and the control logic) can be low-power devices. Hence, the OLSP scheme shown in FIGS. 4A and 4B is a low-cost and low-power-consumption protection scheme.

However, the scheme shown in FIGS. 4A and 4B has a drawback. More specifically, because of the coupling loss introduced by splitter 412, signals carried on each of fibers 414 and 416 can have lower power than the output of amplifier 402. If splitter 412 is a 3-dB coupler, the optical power of signals on each fiber is only half of the power of the input signal to splitter 412, and switch 418 may further reduce the power of the signal to amplifier 404. Although at the other end of fiber span 410 amplifier 404 can re-amplify the signal on fiber 414 or 416, depending on which fiber is selected by switch 418, the amplified signal does not have the same optical signal-to-noise ratio (OSNR) as that of the input signal to splitter 412, because a typical amplifier not only amplifies power but also adds noise. Compared with the unprotected scenario shown in FIG. 1, the same amplifier is now required to amplify a signal that has less than half the power, thus resulting in the amplified signal having a reduced OSNR. For long haul links with many fiber spans, having the OSNR reduced at each span can be a huge problem. Although the loss at splitter 412 can be compensated by increasing the output power of amplifier 402, the loss at switch 418 cannot be compensated in this way without inducing any fiber nonlinear penalty, which can significantly decrease the system performance.

Figure 5A:
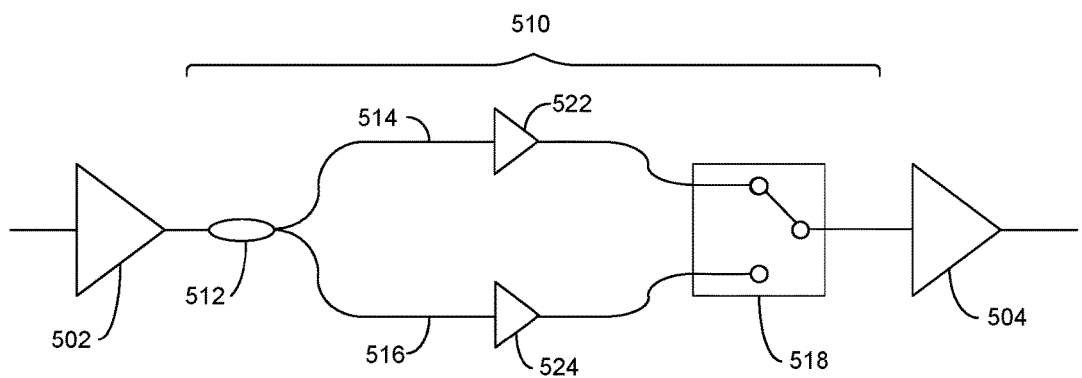
FIGS. 5A and 5B present diagrams illustrating the details of a fiber span implementing OLSP in one direction, in accordance with an embodiment of the present invention.
Figure 5B:
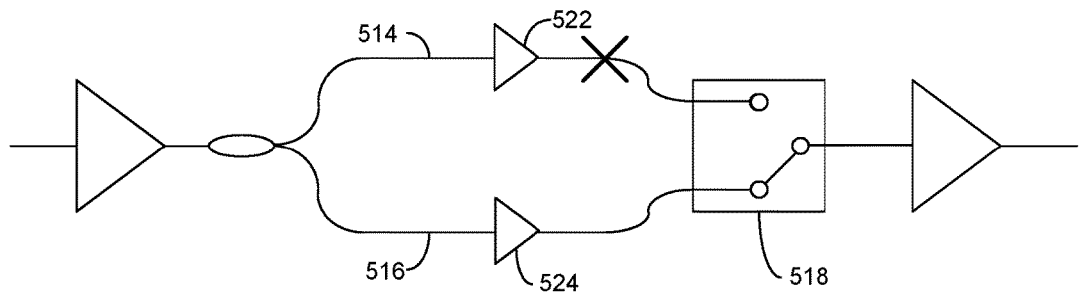

To mitigate the OSNR degradation, in some embodiments, the signal power on each fiber path can be restored before being selected by the switch. FIGS. 5A and 5B present diagrams illustrating the details of a fiber span implementing OLSP in one direction (the other direction is similar), in accordance with an embodiment of the present invention. In FIG. 5A, optical segment 510 is located between amplifiers 502 and 504. Segment 510 includes an optical splitter 512, fiber paths 514 and 516, and a switch 518. Each fiber path can also include a low-noise amplifier. For example, fiber path 514 includes amplifier 522 and fiber path 516 includes amplifier 524.

Similar to what is shown in FIG. 4A, during normal operation, splitter 512 (which can include a 3-dB coupler) splits the output of amplifier 502 into two identical portions and sends each portion to a fiber path. Switch 518 can connect fiber path 514 to the input of amplifier 504, while leaving fiber path 516 unconnected. When a fiber cut or failure occurs on fiber path 514, as shown in FIG. 5B, switch 518 can connect fiber path 516 to the input of amplifier 504 (as shown in FIG. 5B), without interruptions to traffic carried on optical segment 510.

Amplifiers 522 and 524 can be low-gain amplifiers that have a very low noise figure. This way, before the signals on each fiber path reach switch 518, their power can be restored to a level that is similar to or above the power level of the input signal of splitter 512, with minimum OSNR degradation. In some embodiments, low-noise amplifiers 522 and 524 can have a noise figure of about a few dBs (e.g., between three and five dBs).

Signals amplified by amplifiers 522 and 524 can then be sent to switch 518, which selects one of the signals to be amplified by amplifier 504. Because passive splitter 512 does not affect the OSNR of the signals, and amplifiers 522 and 524 have very low impact on the OSNR of the signals, the to-be-amplified signal at the input of amplifier 502 and the to-be amplified signal at the input of amplifier 504 can have similar OSNRs. Considering that amplifiers 502 and 504 can have similar noise figures, the OSNR of their output signals can also be similar. In other words, the OLSP scheme shown in FIGS. 5A and 5B can cause no or minimum degradation on the OSNR of the transmitted signals while providing fiber-cut-induced failure protection.

As shown in FIGS. 5A and 5B, amplifying the split signals before they reach the signal-selection switch can reduce the degradation on the OSNR. However, this approach requires additional amplifiers to be installed in the paths, which can cost more to implement and require additional power to operate. To provide a low-cost, low power consumption solution, one can take advantage of the fact that the amplifiers used in the optical transport network often include multistage (e.g., two- or three-stage) EDFAs, and instead of inserting additional amplifiers in each path, the initial stage of the EDFAs (e.g., the preamplifiers) can be used to amplify the split signals before they reach the signal-selection switch.

Figure 6:
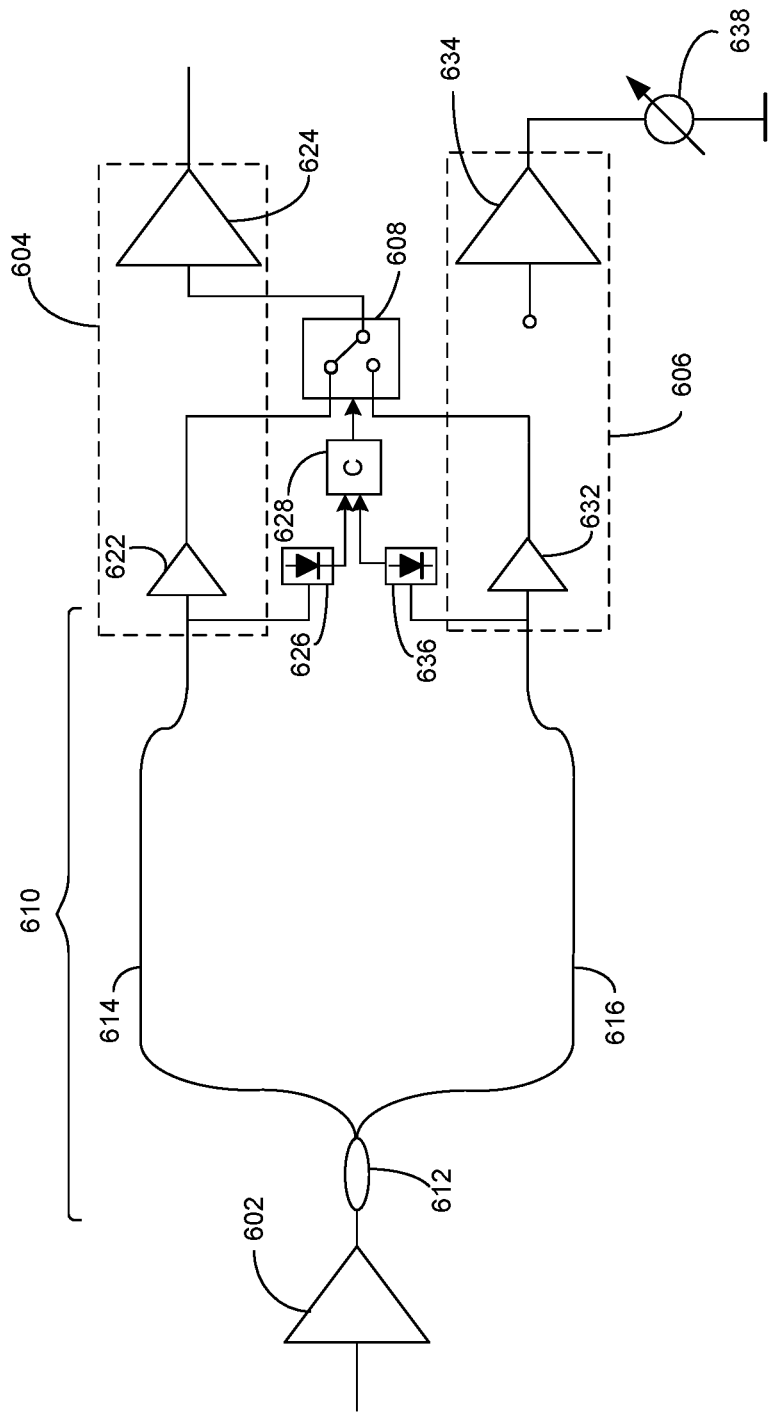
FIG. 6 presents a diagram illustrating an exemplary OLSP scheme in one direction, in accordance with an embodiment of the present invention.

FIG. 6 presents a diagram illustrating an exemplary OLSP scheme in one direction (the other direction is similar), in accordance with an embodiment of the present invention. A fiber span 610 includes a splitter 612 and fibers 614 and 616. Splitter 612 can include a passive optical splitter, such as a 3-dB coupler. At the starting point of fiber span 610, splitter 612 receives a signal sent from a previous stage. Such a signal can be outputted by an amplifier 602. At the ending point of fiber span 610, each of the two fibers (614 and 616) is coupled to an amplifier system. Fiber 614 is coupled to amplifier system 604 and fiber 616 is coupled to amplifier system 606.

Each amplifier system can include a multistage amplifier, such as a two-stage EDFA. For example, amplifier system 604 can include a two-stage EDFA that includes a first-stage EDFA 622 and a second-stage EDFA 624, and amplifier system 606 can also include a first-stage EDFA 632 and a second-stage EDFA 634. The first-stage EDFAs 622 and 632 can be configured to function as preamplifiers and have a low noise figure. In some embodiments, these first-stage EDFAs have a noise figure that is less than 5 dB. Second-stage EDFA 624 can be configured to function as a power amplifier and can provide high gains (e.g., a gain above 20 dB). Note that the input of second-stage EDFA 634 is disconnected and its output can be connected to an attenuator 638 to prevent optical power leakage.

The outputs of the first-stage EDFAs are sent to switch 608, which can be configured to select one of the outputs to send to second-stage EDFA 624. The switching operation of switch 608 can be controlled by a pair of photo detectors, which can be used to detect the presence/absence of optical signals in each of the fibers. In the example shown in FIG. 6, photo detector 626 is coupled to the input of first-stage EDFA 622 and can measure the power of signals carried on fiber 614. Similarly, photo detector 636 is coupled to the input of first-stage EDFA 632 and can measure the power of signals carried on fiber 616. In some embodiments, outputs of photo detectors 626 and 636 are sent to a control logic 628, which controls the switching operation of switch 608. For example, if both photo detectors detect signals, meaning that both fibers are intact and carry signals, a control signal sent from control logic 628 can configure switch 608 to connect the output of first-stage EDFA 622 to second-stage EDFA 624. This way, signals from fiber 614 are selected and sent to the next stage. If photo detector 626 detects that the signal power level is less than a predetermined small value, indicating that fiber 614 may be cut, while photo detector 636 detects the presence of optical signals, control logic 628 can send a control signal that causes switch 608 to connect the output of first-stage EDFA 632 to second-stage EDFA 624. Hence, when a fiber cut or failure occurs in fiber 614, signals from backup fiber 616 are selected and sent to the next stage.

In addition to having photo detectors 626 and 636 coupled to the inputs of first stage EDFAs 622 and 632, respectively, it is also possible to couple the photo detectors to the outputs of the first-stage EDFAs, given that the EDFAs can be configured to automatically shut down if no input is detected. In some embodiments, the photo detectors can be part of the amplification system. For example, many commercially available multistage EDFAs already have built-in photo detectors.

In the example shown in FIG. 6, the amplifier system at the end of each fiber can include commercially available multistage EDFAs. Because there is no need to design new amplifier systems for the OLSP application, this approach can be cost effective. However, this approach can also means that one of the second-stage EDFAs remains idle constantly, thus wasting otherwise useful resources. In FIG. 6, second-stage EDFA 634 is not used and remains idle all the time. If the OLSP scheme is widely implemented, designing a dedicated amplification system may be a better option.

Figure 7:
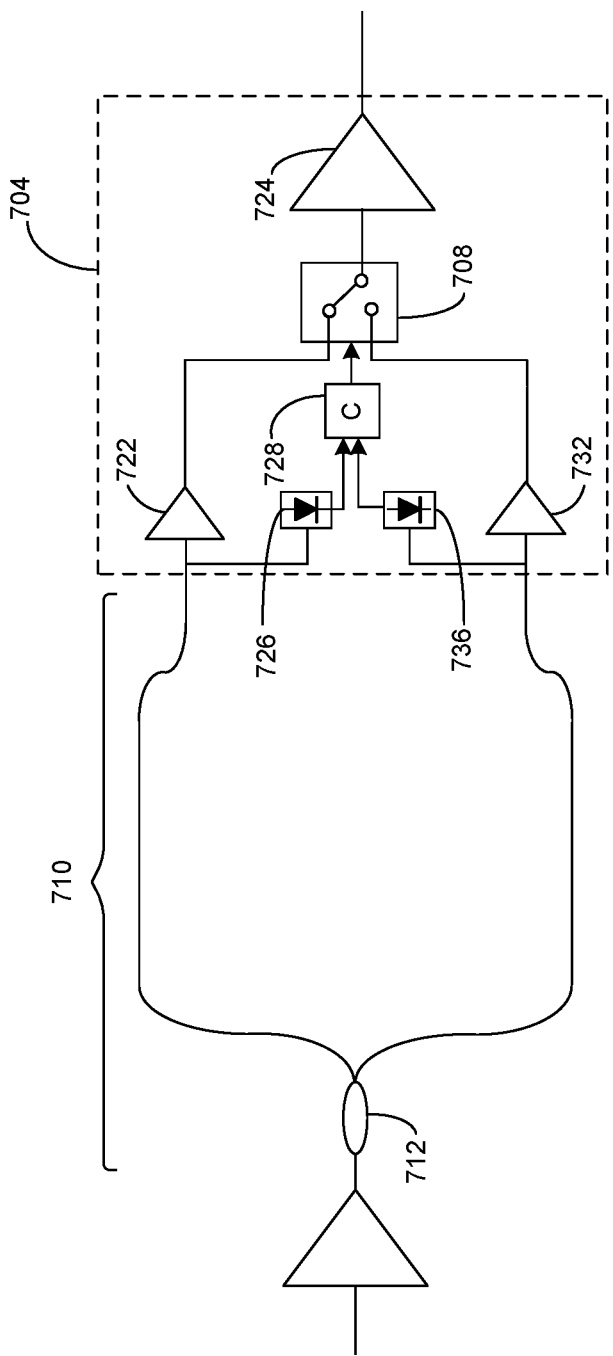
FIG. 7 presents a diagram illustrating an exemplary OLSP scheme in one direction, in accordance with an embodiment of the present invention.

FIG. 7 presents a diagram illustrating an exemplary OLSP scheme in one direction (the other direction is similar), in accordance with an embodiment of the present invention. The OLSP scheme shown in FIG. 7 is similar to the one shown in FIG. 6, except that a particularly designed amplifier system 704 is used at the ending point of fiber span 710. Amplifier system 704 includes a pair of preamplifiers 722 and 732 and a power amplifier 724. Preamplifiers 722 and 732 can include any type of optical amplifier that has a low noise figure, including but not limited to: EDFAs, semiconductor optical amplifiers (SOAs), and Raman amplifiers. Power amplifier 724 can include any type of optical amplifier capable of providing high gains, including but not limited to: EDFAs, SOAs, and Raman amplifiers.

Each preamplifier is coupled to a fiber in fiber span 710 and can amplify optical signals carried by the fiber. The purpose is to compensate for the coupling loss at splitter 712. Amplifier system 704 can also include a switch 708 for selecting one of the outputs of preamplifiers 722 and 732. Operation of switch 708 is similar to that of switch 608, and can be controlled by control logic 728 based on outputs of photo detectors 726 and 736, which are coupled to inputs of preamplifiers 722 and 732, respectively.

Figure 8A:
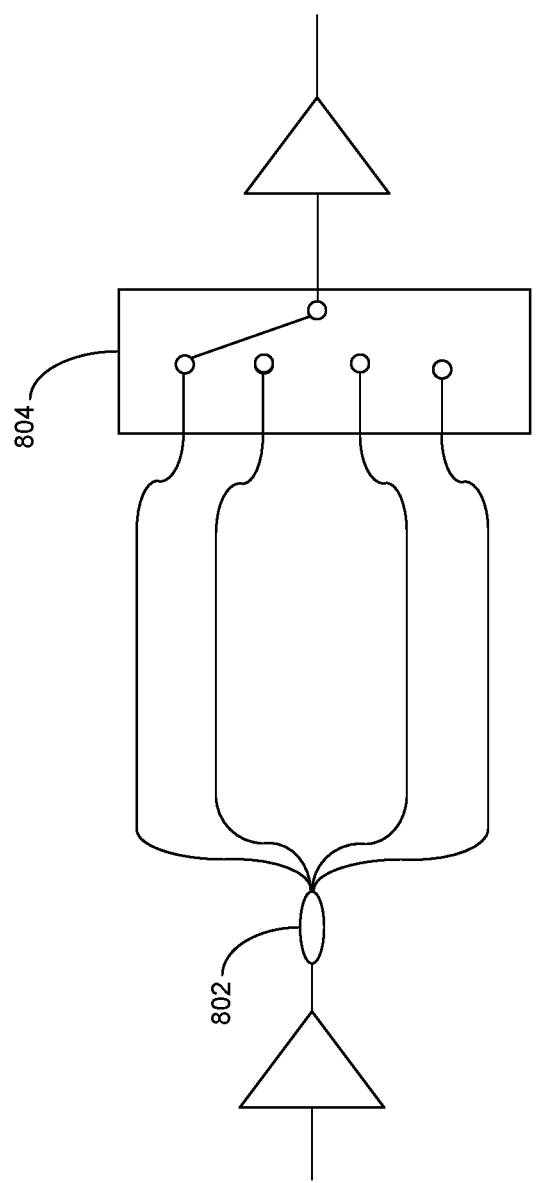
FIG. 8A presents a diagram illustrating an exemplary OLSP scheme in one direction using multiple backup fibers, in accordance with an embodiment of the present invention.
Figure 8B:
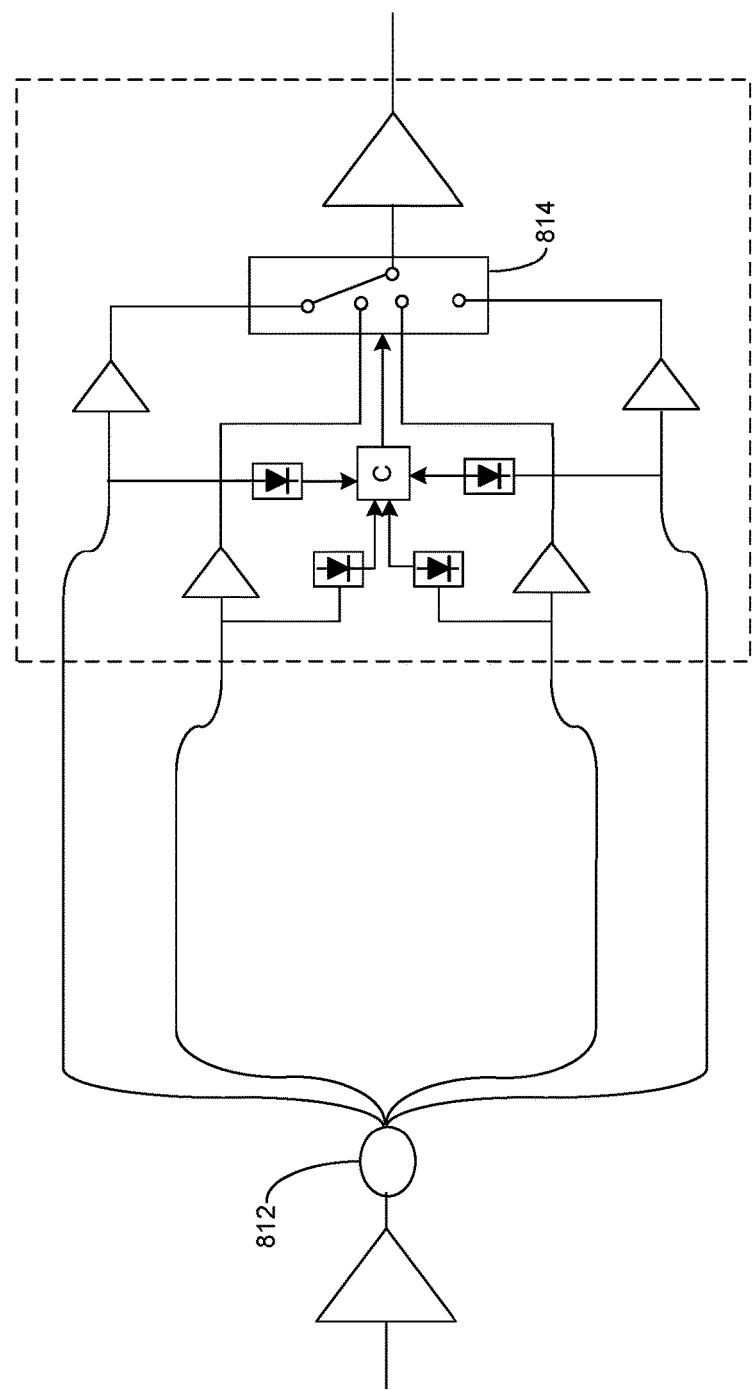
FIG. 8B presents a diagram illustrating an exemplary OLSP scheme in one direction using multiple backup fibers, in accordance with an embodiment of the present invention.

To further reduce the fiber-cut-induced failure rate, it is also possible to provide OLSP using multiple backup fibers. FIG. 8A presents a diagram illustrating an exemplary OLSP scheme in one direction (the other direction is similar) using multiple backup fibers, in accordance with an embodiment of the present invention. The protection scheme shown in FIG. 8A is similar to the one shown in FIGS. 4A and 4B, except that splitter 802 is a 1×4 splitter, and switch 804 is a 4×1 switch. Note that 1×4 splitter 802 has a 6-dB coupling loss, meaning that the degradation in the OSNR of the signals can be worse than the example shown in FIGS. 4A and 4B. FIG. 8B presents a diagram illustrating an exemplary OLSP scheme in one direction (the other direction is similar) using multiple backup fibers, in accordance with an embodiment of the present invention. The protection scheme shown in FIG. 8B is similar to the one shown in FIG. 7, except that splitter 812 is a 1×4 splitter, and switch 814 is a 4×1 switch.

Because one can use the first stage of existing EDFAs in the transport network as the preamplifiers shown in FIG. 8A, the protection scheme shown in FIG. 8B does not require additional components than the ones shown in FIG. 8A, while minimizing the OSNR degradation caused by the protection scheme. Compared with conventional solutions (e.g., the one shown in FIG. 2) that may require duplicated sets of amplification and transmission equipment, the protection schemes shown in FIGS. 8A and 8B cost less to build and consume less power to operate.

In some embodiments, OLSP can be combined with optical multiplex section protection (OMSP) to further enhance the reliability of the optical transport network. OMSP uses a backup route to provide protection against failures on the optical path. In addition to fiber cuts, it can also provide protection against amplifier failure.

Figure 9:
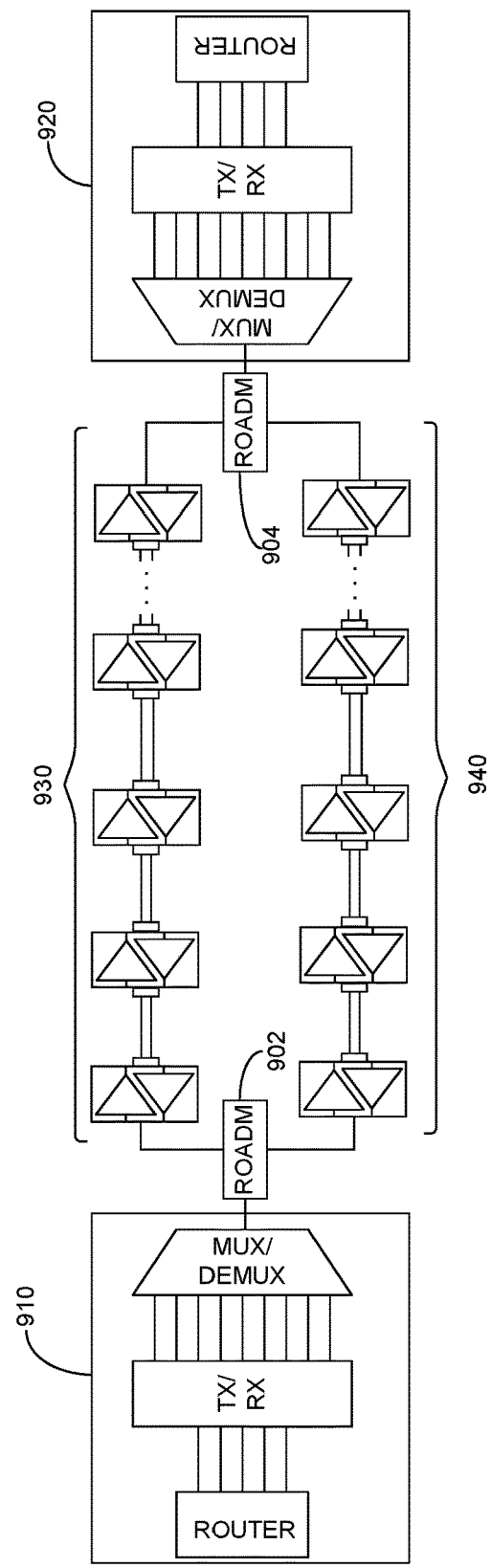
FIG. 9 presents a diagram illustrating an exemplary protection scheme implementing both OMSP and OLSP, in accordance with an embodiment of the present invention.

FIG. 9 presents a diagram illustrating an exemplary protection scheme implementing both OMSP and OLSP, in accordance with an embodiment of the present invention. In FIG. 9, data center 910 can be coupled to data center 920 via a fiber route 930 and a backup fiber route 940. Reconfigurable optical add-drop multiplexers (ROADMs) 902 and 904 can be used to select which route is used to connect the data centers. Unlike the conventional OMSP solution, in the example shown in FIG. 9, each and every fiber span of routes 930 and 940 implements OLSP. In some embodiments, the OLSP scheme can be similar to the ones shown in FIGS. 6 and 7 and have very low negative impact on the OSNR of the signals. Combining OLSP with OMSP can significantly increase the reliability of the fiber link.

Using the aforementioned link between Beijing and Shanghai as an example, by implementing OLSP on top of OMSP, the fiber-cut-induced failure rate can be reduced to 0.01875%×0.01875%=0.000003516%, increasing the availability rate up to 99.999996%, which is better than six nines. If no OLSP is used, up to six routes will be needed to obtain similar availability, which requires significant more equipment.

Figure 10:
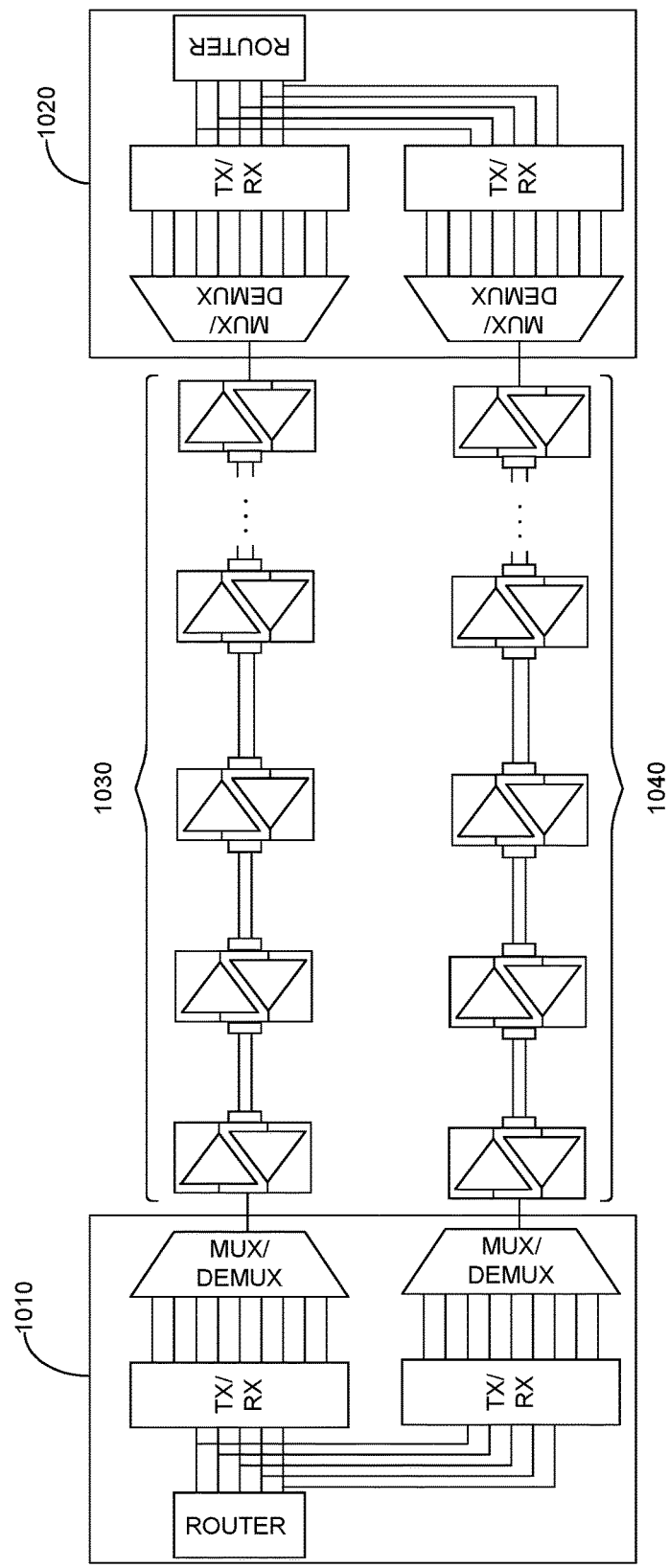
FIG. 10 presents a diagram illustrating an exemplary protection scheme implementing both the IP layer protection and OLSP, in accordance with an embodiment of the present invention.

In some embodiments, OLSP can be combined with the IP protection to enhance the reliability of the optical transport network. The IP layer protection can provide protection against various failures of the optical transmission equipment. FIG. 10 presents a diagram illustrating an exemplary protection scheme implementing both the IP layer protection and OLSP, in accordance with an embodiment of the present invention. In FIG. 10, data center 1010 can be coupled to data center 1020 via a fiber route 1030 and a backup fiber route 1040. Each fiber route is coupled to a set of dedicated optical transmission equipment. In addition, each and every fiber span of routes 1030 and 1040 implements OLSP. In some embodiments, each fiber span can implement OLSP using schemes that are similar to the ones shown in FIGS. 6 and 7 and have very low negative impact on the OSNR of the signals. Combining OLSP with IP layer protection can significantly increase the reliability of the fiber link.

Figure 11:
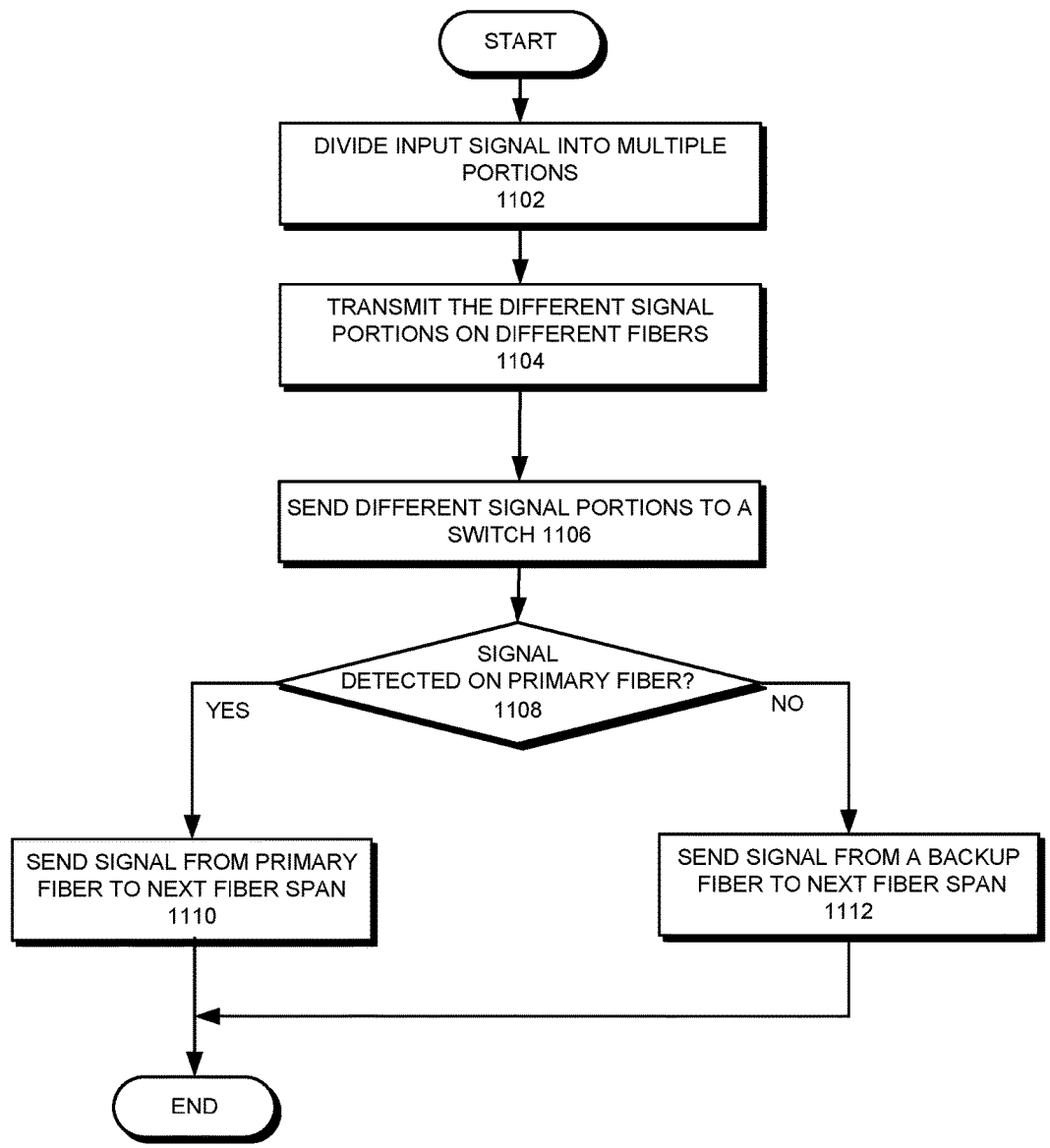
FIG. 11 presents a flowchart illustrating an exemplary OLSP process, in accordance with an embodiment of the present invention.

FIG. 11 presents a flowchart illustrating an exemplary OLSP process, in accordance with an embodiment of the present invention. During operation, a 1×n optical splitter can divide an incoming signal into multiple portions (operation 1102). In some embodiments, a 3-dB coupler can divide an incoming signal into two equal portions. Each portion is then separately transmitted by an optical fiber (operation 1104). The optical fibers, each of which carries a portion of the incoming signal, travel through different physical paths to ensure that a cut on one fiber does not negatively affect other fibers.

The different portions of the signal are sent to a n×1 switch (operation 1106). The optical switch then selects, based on outputs of photo detectors detecting power in each fiber, one signal portion to be sent to the next fiber span. One of the fibers can be chosen as the primary fiber, and a photo detector coupled to the primary fiber can determine whether an optical signal is present on the primary fiber (operation 1108). If so, the switch will connect the primary fiber to the next fiber span (operation 1110). Note that this is the default configuration of the switch. If no power is detected on the primary fiber, indicating a possible fiber cut or failure on the primary fiber, the switch can select one of the other fibers to send the signal to the next fiber span (operation 1112). Note that the elected signal needs to be amplified (e.g., by an EDFA) before being sent to the next fiber span. In some embodiments, prior to arriving at the switch, each portion of the optical signal is amplified by a low-noise amplifier to compensate for the coupling loss at the passive coupler. To reduce cost, the low-noise amplifier can be the first stage of a two-stage EDFA located at the end of the fiber span.

In general, embodiments of the present invention provide a method and system for reducing fiber-cut-induced failure rate of an optical link by adding, at each fiber span of the link, one or more backup fibers that are physically separated from the primary fiber to allow traffic to be switched onto a backup fiber when the primary fiber is cut. Because the backup fiber is inserted using passive components, such as couplers and switches, this protection scheme costs less to build and consumes less power to operate compared to conventional protection schemes. To mitigate the negative impact to the OSNR, signals on each fiber can be amplified by a low-noise preamplifier before they reach the switch. To reduce equipment cost, one can use the first stage of a two-stage EDFA to function as a preamplifier, and insert the switch between the two stages of the EDFA. The EDFA itself is part of the original unprotected link and, hence, does not incur additional equipment cost. The very low noise figure of the first stage of a typical EDFA means that the OSNR of the amplified signal can be comparable to the original signal.

In addition to the examples shown in FIGS. 3 and 9-10 where the optical link is a point-to-point link between two data centers, this protection scheme can also be used in other network topologies, such as ring networks or mesh networks. In the drawings (including FIGS. 4-8B), only one transmission direction is shown. In practice, both transmission directions on a link can implement similar protection schemes.

In the examples in FIGS. 9 and 10, OLSP is combined with other known protection schemes, such as OMSP and the IP layer protection. In addition to OMSP and IP layer protection, OLSP can also be combined with other types of protection schemes, such as optical channel protection (OChP), multiplex section-shared protection rings (MS-SPRings), etc.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

What is claimed is:

1. An optical link coupling two nodes in an optical transport network, the optical link comprising:
    a plurality of amplifier systems;
    a plurality of fiber spans;
    wherein each and every fiber span is positioned between first and second amplifier systems;
    wherein each fiber span consists of a plurality of passive components, which include:
        a first optical fiber for transmitting signals in a first direction;
        a second optical fiber for transmitting signals in the first direction; and
        a splitter,
    wherein an input of the splitter is coupled to the first amplifier system, and wherein first and second outputs of the splitter are coupled to the second amplifier system via the first and second optical fibers; and
    wherein a respective amplifier system comprises at least:
        a first erbium-doped fiber amplifier (EDFA) and a second EDFA, with each of the first and second EDFAs comprising two separate stages, wherein first stages of the first and second EDFAs comprise pre-amplifiers with their inputs separately coupled to the first and second optical fibers, wherein a second stage of the first EDFA comprises a power amplifier with its output coupled to an adjacent fiber span, and wherein a second stage of the second EDFA has its input disconnected and its output coupled to an attenuator; and
        an optical switch comprising two inputs and an output, wherein the two inputs of the optical switch are separately coupled to outputs of the first stages of the first and second EDFAs, and wherein the output of the optical switch is coupled to an input of the second stage of the first EDFA, thereby enabling protection against a fiber failure over the first or second optical fiber.

2. The optical link of claim 1, wherein the splitter is a 3-dB optical coupler, and wherein the optical switch is a 2×1 switch.

3. The optical link of claim 1, wherein each and every fiber span of the plurality of fiber spans includes at least two optical fibers, wherein the at least two optical fibers are carrying substantially similar signals to provide protection against fiber failures in the optical link.

4. The optical link of claim 1, wherein the pre-amplifiers are low-noise pre-amplifiers.

5. The optical link of claim 1, further comprising first and second photo detectors coupled to the first and second optical fibers, respectively; wherein the optical switch is controlled based on outputs of the first and second photo detectors.

6. The optical link of claim 1, further comprising first and second photo detectors coupled to outputs of the first stages of the first and second EDFAs, respectively; wherein the optical switch is controlled based on outputs of the first and second photo detectors.

7. The optical link of claim 1, wherein each fiber span further comprises a third and fourth optical fibers for transmitting signals in a second direction.

8. A failure-protection mechanism for protecting against fiber failures on a fiber span positioned between first and second amplifier systems, wherein the fiber span consists of a plurality of passive components, and wherein the failure-protection mechanism comprises:
    a backup optical fiber;
    a splitter configured to:
        divide signals received from the first amplifier system into at least two portions;
        send a first portion of the signals received from the first amplifier system to a primary optical fiber, wherein the primary optical fiber and the backup optical fiber are configured to transmit signals in a same direction; and
        send a second portion of the signals received from the first amplifier system to the backup optical fiber;
    wherein a respective amplifier system comprises at least:
        a first erbium-doped fiber amplifier (EDFA) and a second EDFA, with each of the first and second EDFAs comprising two separate stages, wherein inputs of first stages of the first and second EDFAs comprise pre-amplifiers with their inputs separately coupled to the first and second optical fibers, wherein a second stage of the first EDFA comprises a power amplifier with its output coupled to an adjacent fiber span, and wherein a second stage of the second EDFA has its input disconnected and its output coupled to an attenuator; and
        an optical switch comprising two inputs and an output, wherein the two inputs of the optical switch are separately coupled to outputs of the first stages of the first and second EDFAs, and wherein the output of the optical switch is coupled to an input of the second stage of the first EDFA, thereby enabling protection against a fiber failure over the first or second optical fiber.

9. The failure-protection mechanism of claim 8, wherein the splitter is a 3-dB optical coupler, and wherein the switch is a 2×1 optical switch.

10. The failure-protection mechanism of claim 8, further comprising first and second photo detectors coupled to the primary and backup optical fibers, respectively; wherein the switch is controlled based on outputs of the first and second photo detectors.

11. The failure-protection mechanism of claim 8, further comprising first and second photo detectors coupled to outputs of the first stages of the first and second EDFAs, respectively; wherein the optical switch is controlled based on outputs of the first and second photo detectors.

12. A method for protecting against fiber-cut-induced failures on a fiber span consisting of a plurality of passive components positioned between first and second amplifier systems in an optical transport network, comprising:
    coupling a splitter to the first amplifier system to divide signals received from the first amplifier system into at least two portions;
    sending a first portion of the signals to a primary optical fiber;
    sending a second portion of the signals to a backup optical fiber, wherein the primary and backup optical fibers are configured to transmit signals in a same direction;
    coupling the primary and backup optical fibers to the second amplifier system;
    wherein a respective amplifier system comprises at least:

a first erbium-doped fiber amplifier (EDFA) and a second EDFA, with each of the first and second EDFAs comprising two separate stages, wherein first stages of the first and second EDFAs comprise pre-amplifiers with their inputs separately coupled to the first and second optical fibers, wherein a second stage of the first EDFA comprises a power amplifier with its output coupled to an adjacent fiber span, and wherein a second stage of the second EDFA has its input disconnected and its output coupled to an attenuator; and an optical switch comprising two inputs and an output, wherein two inputs of the optical switch are separately coupled to outputs of the first stages of the first and second EDFAs, and wherein the output of the optical switch is coupled to an input of the second stage of the first EDFA, thereby enabling protection against a fiber failure over the first or second optical fiber;

in response to determining that the primary optical fiber functions normally, controlling the switch to couple an output of the first stage of the first EDFA to the input of the second stage of the first EDFA; and in response to determining that the primary optical fiber fails, controlling the switch to couple an output of the first stage of the second EDFA to the input of the second stage of the first EDFA.

13. The method of claim 12, wherein the splitter is a 3-dB optical coupler, and wherein the switch is a 2×1 optical switch.

14. The method of claim 12, wherein determining whether the primary optical fiber fails involves detecting output power of the primary optical fiber using a photo detector.

15. The method of claim 12, wherein determining whether the primary optical fiber fails involves detecting output power of the first stage of the first EDFA using a photo detector.

* * * * *